US010677306B1

(12) United States Patent
Lin (10) Patent No.: US 10,677,306 B1
(45) Date of Patent: Jun. 9, 2020

(54) CUSHION DEVICE FOR FOLDABLE CHAIR

(71) Applicant: Spec Seats Technologies Inc., Taoyuan (TW)

(72) Inventor: Mei Chuen Lin, Taoyuan (TW)

(73) Assignee: Spec Seats Technologies Inc., Taoyuan (TW)

( * ) Notice: Subject to any disclaimer, the term of this patent is extended or adjusted under 35 U.S.C. 154(b) by 0 days.

(21) Appl. No.: 16/239,289

(22) Filed: Jan. 3, 2019

(51) Int. Cl.
*A47C 4/20* (2006.01)
*F16F 1/12* (2006.01)
*A47C 4/42* (2006.01)
*F16F 1/44* (2006.01)
*F16F 15/08* (2006.01)
*F03G 1/02* (2006.01)
*F16F 1/373* (2006.01)

(52) U.S. Cl.
CPC ............... *F16F 1/123* (2013.01); *A47C 4/20* (2013.01); *A47C 4/42* (2013.01); *F03G 1/02* (2013.01); *F16F 1/12* (2013.01); *F16F 1/3732* (2013.01); *F16F 1/44* (2013.01); *F16F 15/08* (2013.01); *F16F 2224/025* (2013.01); *F16F 2236/04* (2013.01)

(58) Field of Classification Search
CPC . F16F 1/04; F16F 2236/08; F16F 1/12; A47C 4/20
USPC .................................................. 267/155, 179
See application file for complete search history.

(56) References Cited

U.S. PATENT DOCUMENTS

| | | | | |
|---|---|---|---|---|
| 1,756,413 A * | 4/1930 | Wilke | ................... | A47D 13/107 248/341 |
| 2,651,826 A * | 9/1953 | Carpenter | ............... | F16L 3/227 248/507 |
| 4,372,430 A * | 2/1983 | Borugian | ................ | F16D 65/09 188/216 |
| 5,692,599 A * | 12/1997 | Winter | ................. | H01H 71/525 200/401 |
| 8,561,330 B2 * | 10/2013 | Siegenthaler | .......... | B21D 39/00 160/378 |
| 8,646,762 B2 * | 2/2014 | Krajenke | ............... | E05F 1/1215 267/170 |

FOREIGN PATENT DOCUMENTS

| | | | | |
|---|---|---|---|---|
| DE | 3414690 A1 * | 10/1985 | ................ | F16F 1/10 |
| JP | 58028030 A * | 2/1983 | ................ | F16F 1/06 |
| TW | M404657 U1 | 6/2011 | | |

\* cited by examiner

*Primary Examiner* — Timothy J Brindley
(74) *Attorney, Agent, or Firm* — Wang Law Firm, Inc.

(57) ABSTRACT

A cushion device for a foldable chair includes a buffer member and a tension spring. The buffer member includes a sleeve portion for sleeving over a side part of a rear leg, a buffer portion provided on the sleeve portion and an embedded portion provided along a side of the sleeve portion and embedded inside a side channel of the rear leg and secured thereat via a fixing element. The tension spring includes a spring body having a first hooking portion fixed a pivot plate of a seat and a second hooking portion including a second extension section, a second bent section engaging a limiting plate of a front leg and a third extension section extending from the second bent section in such a manner to prevent disengagement of the second bent section of the tension spring from a hooking hole in the limiting plate.

11 Claims, 12 Drawing Sheets

CUSHION DEVICE FOR FOLDABLE CHAIR

BACKGROUND OF THE INVENTION

1. Field of the Invention

The present invention relates generally to a foldable chair, in particular to an automatic lifting cushion device for a foldable chair and a chair design, in which a spring is less likely fallen off the foldable chair and in which a cushion seat is designed with an opening such that upon the occupant leaves the seat, the cushion seat can be automatically rotated in such a manner to reduce collision noises and vibration caused by impact of the cushion seat.

2. The Prior Arts

Some chairs are foldable so that when they are not in use, the chairs can be folded in order to reduce the storage space and so as to facilitate in transportation.

Figure 1A:
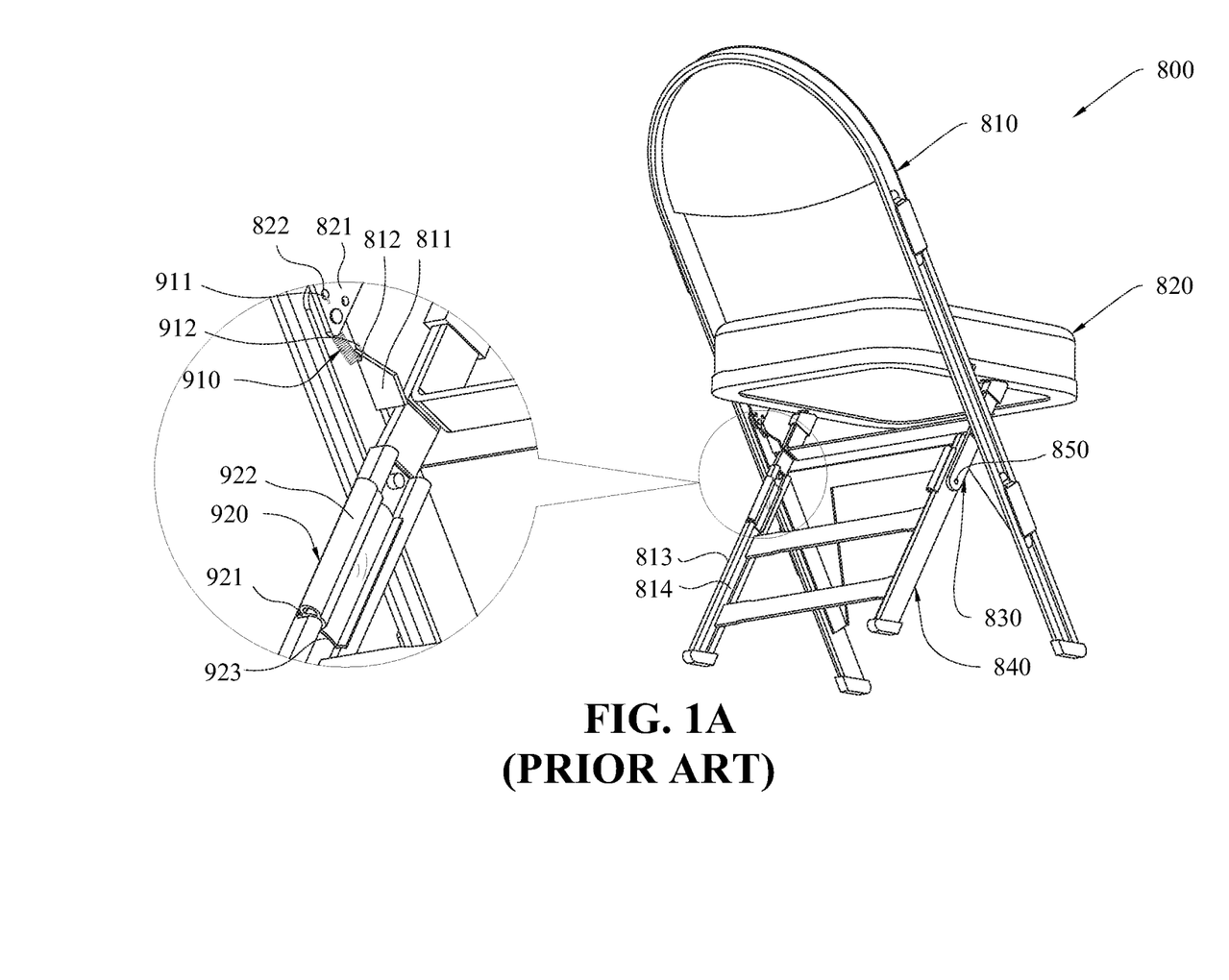
FIG. 1A is a perspective and enlarged view of a conventional foldable chair.

FIG. 1A shows a perspective view of a foldable chair 800 that includes a pair of front legs 810 provided with at least one limiting plate 811, a seat 820 having at least one pivot plate 821, a support frame 830 to which two lateral sides of the front legs 810 are connected pivotally via the pivot plate 821 and a pair of rear legs 840 connected securely to the support frame 830 via a fixing element 850. Since the front legs 810, the seat 820 and the support frame 830 are connected pivotally relative to one another, the seat 820 has the characteristics of being foldable relative to the front legs 810 so that when not in use, the chair can be folded by one hand gripping the seat 820 while the other hand gripping the front legs 810 and simultaneously moving the two toward each other, thereby causing inconvenience to the user since both hands must be applied.

Figure 1B:
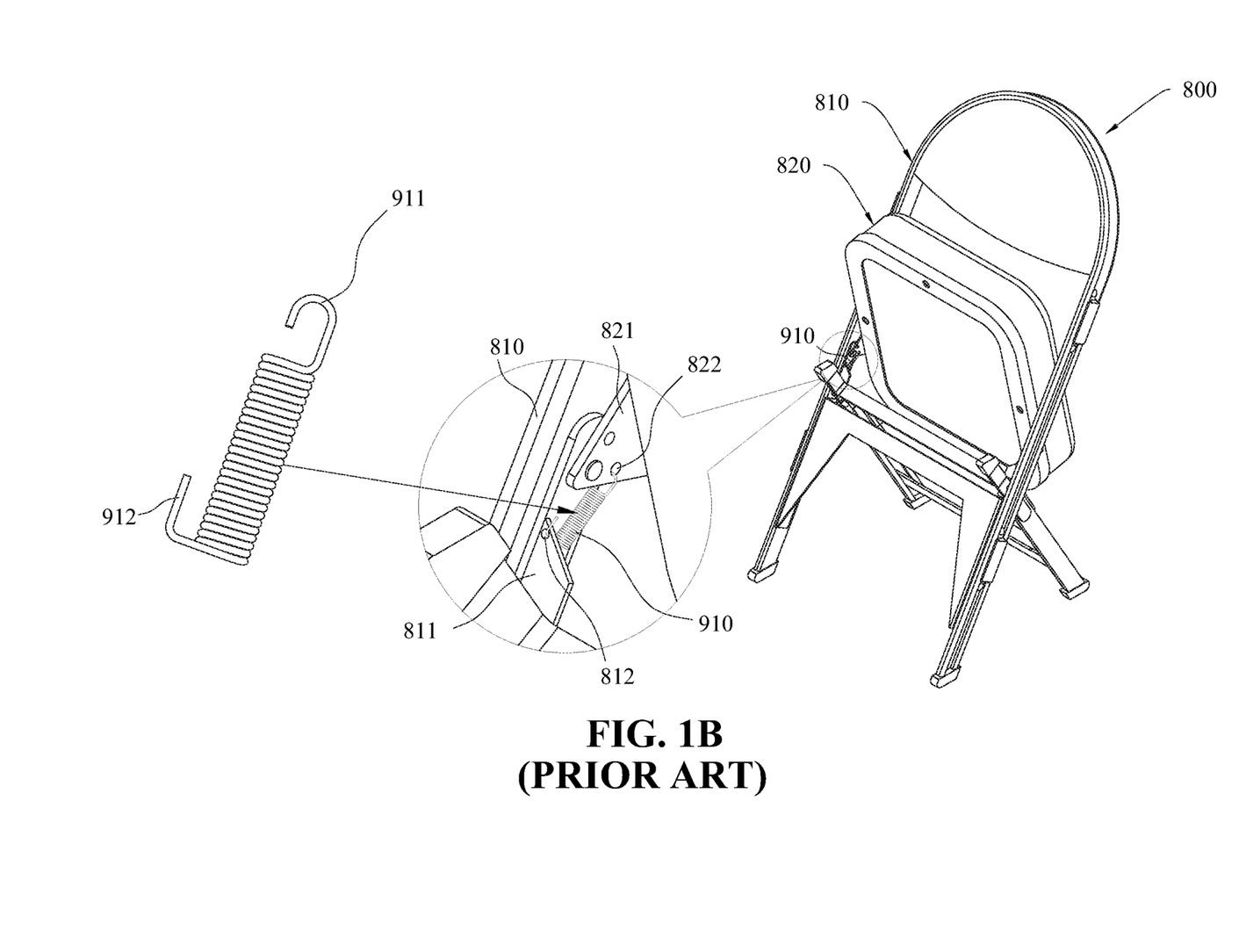
FIG. 1B is a perspective and enlarged view of the conventional foldable chair, illustrating how a tension is installed therein.

In order to eliminate the aforesaid problem, the applicant has already invented a foldable chair as shown in FIG. 1B of Patent Application No. TW099225312, in which a tension spring 910 is applied. As illustrated, the tension spring 910 includes a spring coil and two engaging hooks 911, 912 extending from two opposite ends of the spring coil for hooking the seat 820 and the front leg 810. When a person is seated on the seat 820, the tension spring 910 is under tension in a stretch-out state. When the seated person stands up, the seat 820 is automatically folded into a folded condition due to restoration force of the tension spring 910.

Note that the upper engaging hook 911 of the tension spring 910 has a downward curved arc shape, and the lower engaging hook 912 is L-shaped that is 90 degrees vertically upward. The upper engaging hook 911 of the tension spring 910 engages a hooking hole 822 in the pivot plate 821 while the L-shaped lower engaging hook 912 passes through a hooking hole 812 in the limiting plate 811. The lower engaging hook 912 of the tension spring 910 with such a design (L shape) may slide out off the hooking hole 812 due to the loss of elasticity after a period of use, so that the tension spring 910 loses its function and the seat 820 loses the automatic return ability to the folded condition.

Figure 1C:
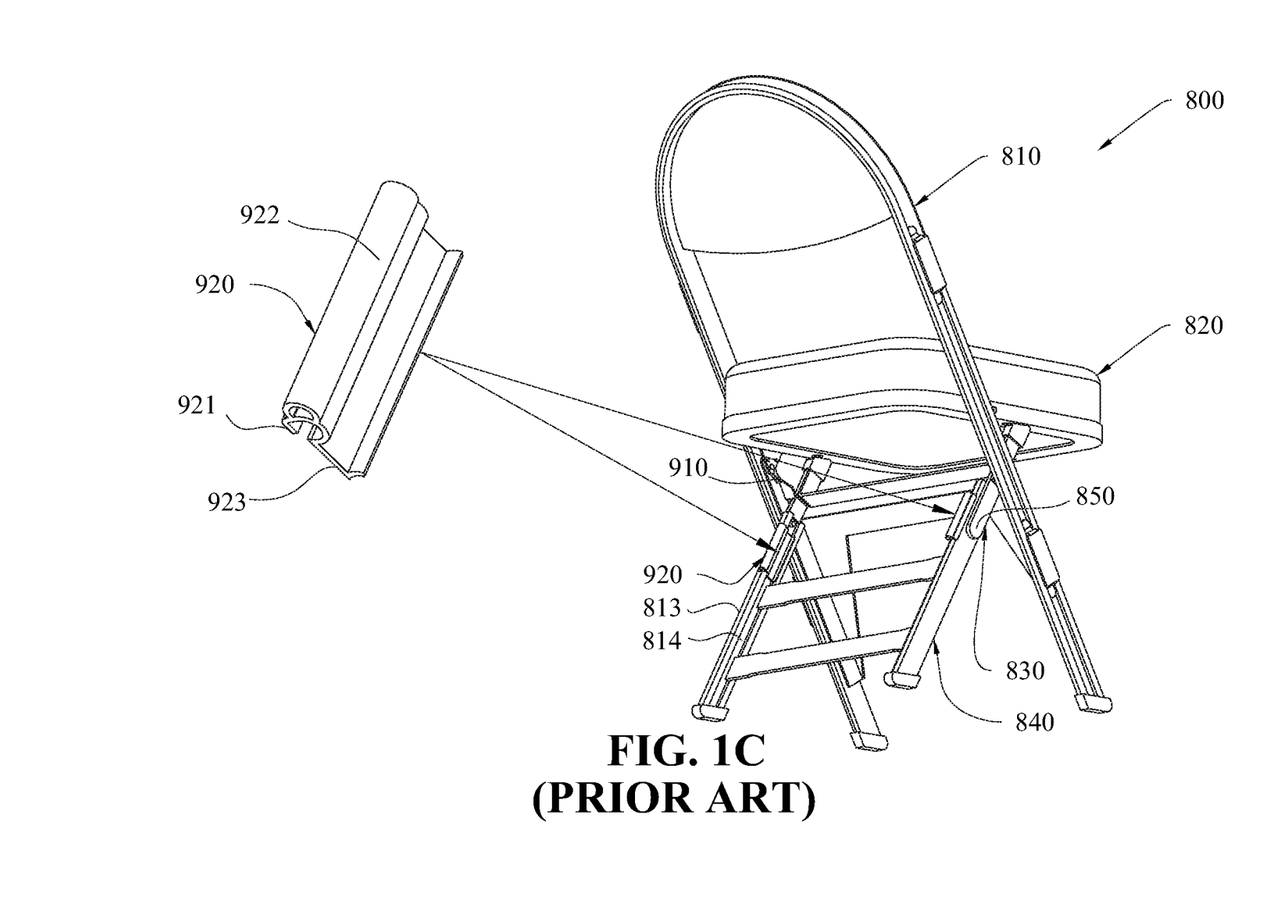
FIG. 1C is a perspective and enlarged view of the conventional foldable chair, illustrating how a buffer member is installed therein.

On the other hand, when the seat 820 returns to the folded condition due to restoration force of the tension 910, the seat 820 collides against the rear leg 840 to generate a great sound and vibration. Generally, a buffer pad 920 is mounted on the rear leg 840 of a foldable chair. The buffer pad 920 is fabricated from a soft rubber. As shown in FIG. 1C, the buffer pad 920 includes a sleeve portion 921 for sleeving over a side part 813 of the rear leg 840, a buffer portion 922 provided on a top side of the sleeve portion 921 and an embedded portion 923 provided at a lower side of the sleeve portion 921 in order to be embedded inside a side channel 814 of the rear leg 840.

One disadvantage resides in that when embedding the embedded portion 923 inside the side channel 814 of the rear leg 840, the embedded portion 923 is not flush with the exposed surface of the side channel 814 due to presence of the fixing element 850 in the side channel 814. Under this condition, frequent collision of the seat 820 against the buffer portion 922 may result in downward sliding of the sleeve portion 921 on the rear leg 840, finally leading to collision of the seat 820 against the rear leg 840 and hence generating noises and damaging either the seat 820 or the rear leg 840.

SUMMARY OF THE INVENTION

A primary objective of the present invention is to provide a seat cushion device for a foldable chair, in which both ends of the tension spring are designed in such a manner that they do not easily deformed and are less likely to fall off from the foldable chair.

A secondary objective of the present invention is to provide a seat cushion device for a foldable chair, in which an embedded portion of a buffer member can be attached to a side channel of the rear leg of the foldable chair to avoid the blocking of a fixing member.

In order to achieve the above objectives, a seat cushion device is provided according to the present invention for a foldable chair that includes a pair of front legs provided with a limiting plate, a seat, a support frame, and a pair of rear legs, the seat including a pivot plate via which the support frame is connected pivotally to the seat and a fixing element for connecting the support frame securely to the rear legs. The seat cushion device includes: a buffer member and a tension spring.

The buffer member has a sleeve portion for sleeving over a side part of the rear leg, a buffer portion provided on a top side of the sleeve portion and an embedded portion provided along a lateral side of the sleeve portion in order to be embedded in a side channel of the rear leg, the embedded portion being formed with a fixing hole to permit extension of the fixing element therethrough.

The tension spring includes a spring body having opposite first and second ends, a first hooking portion and a second hooking portion disposed at the first and second ends respectively such that the first hooking portion includes a first extension section extending in a direction away from the spring body parallel to an axis of the spring body and a first bent section extending curvedly from the first extension section toward the spring body in order to engage the pivot plate of the seat while the second hooking portion includes a second extension section extending in a direction away the spring body parallel to an axis of the spring body, a second bent section extending curvedly from one end of the second extension section toward the spring body in order to engage the limiting plate of the front leg and a third extension section extending from one end of the second bent section so as to dispose aside from the spring body in order to define an axis which combines with an axis of the second extension section to form an included angle, wherein the third extension section has a longitudinal length measured from one end of the second bent section distal from the spring body equivalent to or greater than ⅓ length of the spring body.

In one embodiment of the present invention, the included angle ranges from 0-45 degrees. Preferably, the included angle is 30 degrees.

In one embodiment of the present invention, the second hooking portion further includes a fourth extension section extending integrally from the third extension section and having a longitudinal length shorter than that of the third extension section.

In one embodiment of the present invention, when the spring body is viewed from the second end toward the first end thereof, the axis of the third extension section defines an angle deviating from a plane extending perpendicularly to the axis of the spring body. Preferably, the deviating angle is 10 degrees with respect to the plane extending perpendicularly to the axis of the spring body.

In one embodiment of the present invention, the pivot plate is formed with a first hooking hole having an axis perpendicularly crossing an axis of the front leg and permitting engaging of the first bent section of the first hooking portion of the tension spring and wherein the limiting plate is formed with a second hooking hole to permit engaging of the second bent section of the second hooking portion of the tension spring.

In one embodiment of the present invention, the buffer portion of the buffer member has two opposite ends in form of a hollow configuration, thereby defining a hollow tube between the two opposite ends.

In one embodiment of the present invention, the sleeve portion of the buffer member is generally G-shaped cross section so as to define a notch at a lower part thereof for sleeving on the side part of the rear leg.

In one embodiment of the present invention, the side part of the rear leg is generally curled outward in order to form an elongated roll such that an inner profile of the sleeve portion of the buffer member is configured to be sleeved over the side part of the rear leg.

In one embodiment of the present invention, the side channel of the rear leg is a tail socket in cross section while the embedded portion of the buffer member is configured as a tail in cross section for fitting securely into the side channel.

In a foldable chair provided with the seat cushion device of the present invention, the tension spring is installed between the front leg and the seat and due to presence of the included angle formed between axes of the third extension section and the second extension section, the second bent section of the tension spring is prevented from deformation even after a long period of use and thus prevented from disengaging the second hooking hole of the limiting plate. The disengagement of the tension spring from the limiting plate is further enhanced due to bending of the fourth extension section toward the spring body of the tension spring. Moreover, since the buffer member is mounted on the rear leg of the chair, little noise is generated when the seat collides against the rear leg when the chair is folded into the folded condition.

Another aspect of the present invention resides in that the embedded portion of the buffer member is embedded into the side channel of the rear leg to avoid in direct contact with the fixing element of the rear leg so as to dispose the embedded portion and the side channel flush relative to each other. Under this condition, the buffer member does not slide downward of the rear leg when the seat collides against the rear leg during the folding operation. In other words, the buffer member of the cushion device of the present invention absorbs the vibration caused by the impact of the seat on the rear leg.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 2:
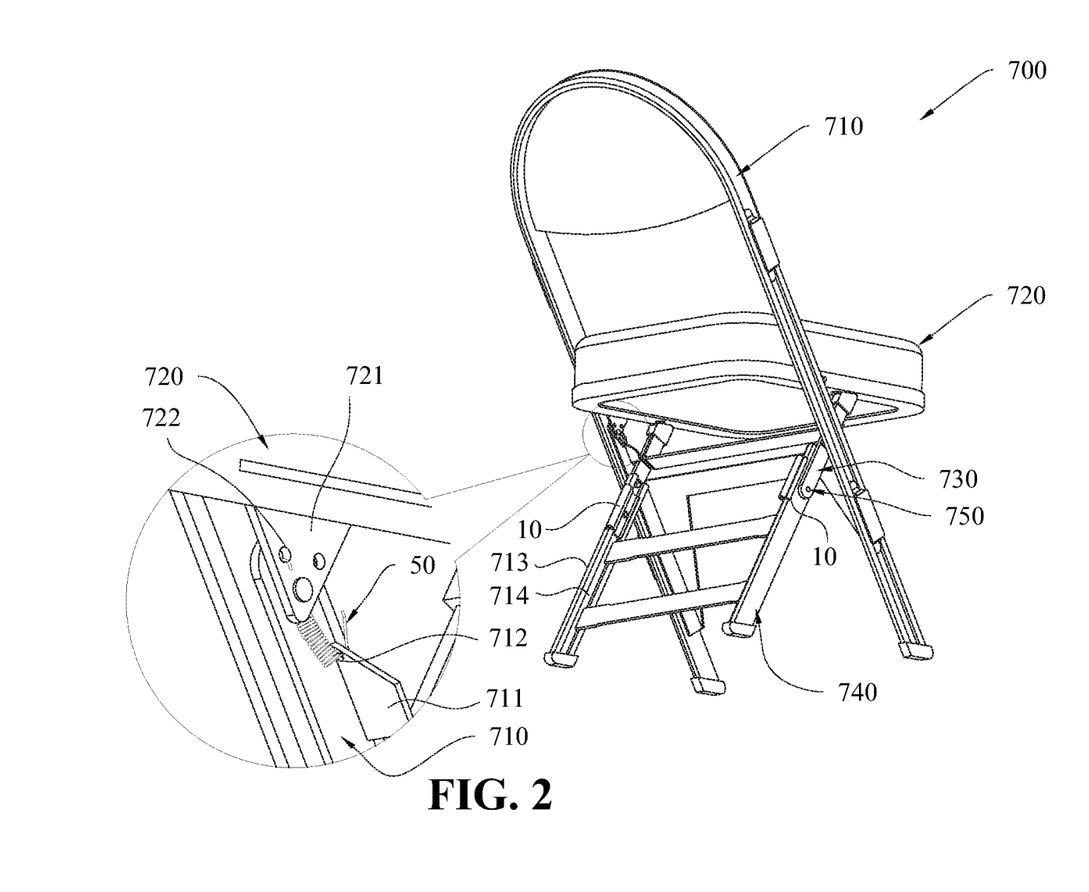
FIG. 2 is a perspective and enlarged view of a foldable chair provided with a cushion device of the present invention.

FIG. 2 is a perspective and enlarged view of a foldable chair provided with a cushion device of the present invention. As shown, the foldable chair 700 includes a pair of front legs 710 provided with at least one limiting plate 711, a seat 720, a support frame 730, and a pair of rear legs 740, the seat 720 including a pivot plate 721, the support frame 730 is connected securely to the rear legs 740 via a fixing element 750 while the front legs 710 and the seat 720 are connected pivotally to the support frame 730 via the pivot plate 721 such that the seat 20 has the characteristics of foldable ability. In this embodiment, the pivot plate 721 is formed with a first hooking hole 722 having an axis perpendicularly crossing an axis of the front leg 710 while the limiting plate 711 is formed with a second hooking hole 712, the purpose of which will be described in the following.

The cushion device of the present invention is installed in a foldable chair having the above elements, and includes: a buffer member 10 and a tension spring 50, detailed structures of which are given in the following.

Figure 3A:
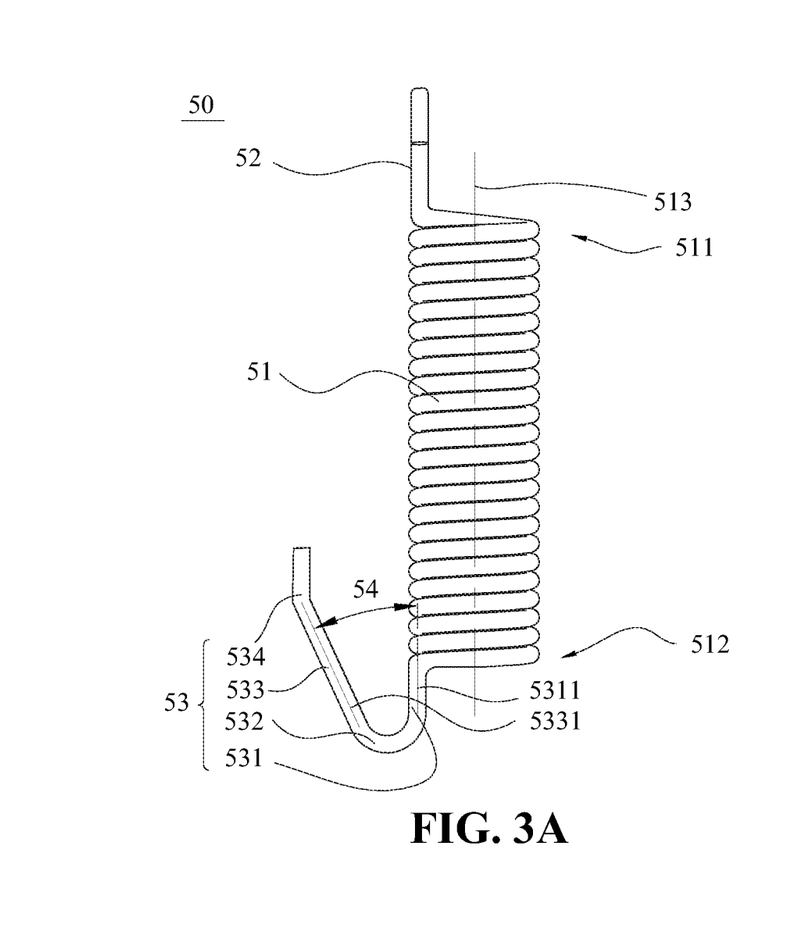
FIGS. 3A and 3B are lateral views of a tension spring employed in the cushion device of the present invention for a foldable chair.
Figure 3B:
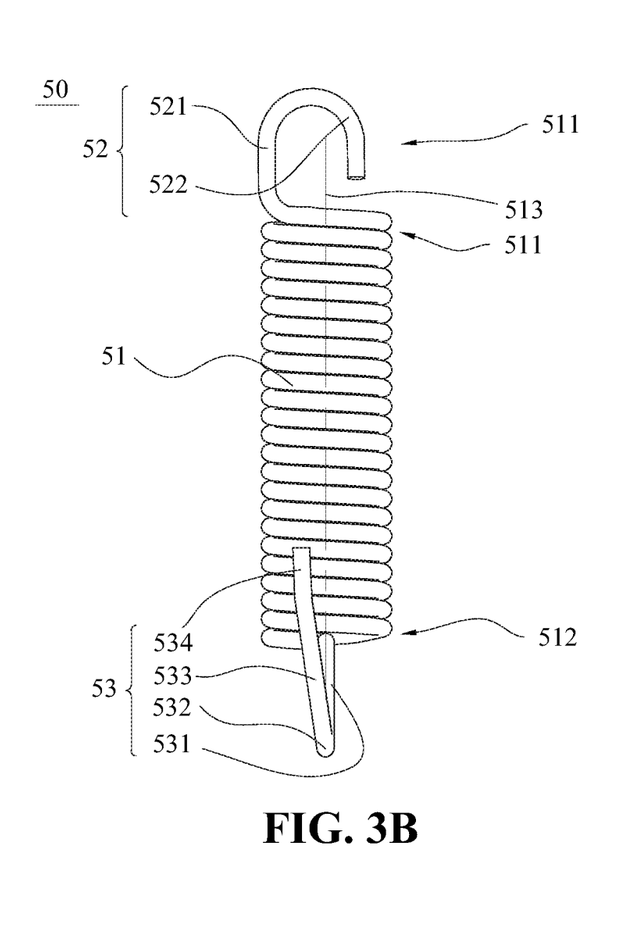

FIGS. 3A and 3B are lateral views of a tension spring employed in the cushion device of the present invention for a foldable chair. The tension spring 50 includes a spring body 51 having opposite first and second ends 511, 512, a first hooking portion 52 and a second hooking portion 53 disposed at the first and second ends 511, 512 respectively.

The first hooking portion 52 includes a first extension section 521 extending in a direction away from the spring body 51 parallel to an axis 513 of the spring body 51 and a first bent section 522 extending curvedly from the first extension section 521 toward the spring body 51 in order to engage the first hooking hole 722 in the pivot plate 721 of the seat 720. The second hooking portion 53 includes a second extension section 531 extending in a direction away the spring body 51 parallel to an axis 513 of the spring body 51, a second bent section 532 extending curvedly from one end of the second extension section 531 toward the spring body 51 in order to engage the second hooking hole 712 in the limiting plate 711 of the front leg 710 and a third extension section 533 extending from one end of the second bent section 532 so as to dispose aside from the spring body 51 in order to define an axis 5331 which combines with an axis 5311 of the second extension section 531 to form an included angle 54. The second hooking portion 53 further includes a fourth extension section 534 extending integrally from the third extension section 533 in a direction away from the second bent section 532 so as to be parallel with an axis 513 of the spring body 51. Preferably, the fourth extension section 534 has a longitudinal length shorter than that of the third extension section 533.

Preferably, the third extension section 533 has a longitudinal length measured from one end of the second bent section 532 distal from the spring body 51 equivalent to or greater than ⅓ length of the spring body 51. In one embodiment of the present invention, the included angle 54 ranges from 0-45 degrees. Preferably, the included angle 54 is 30 degrees.

Figure 4:
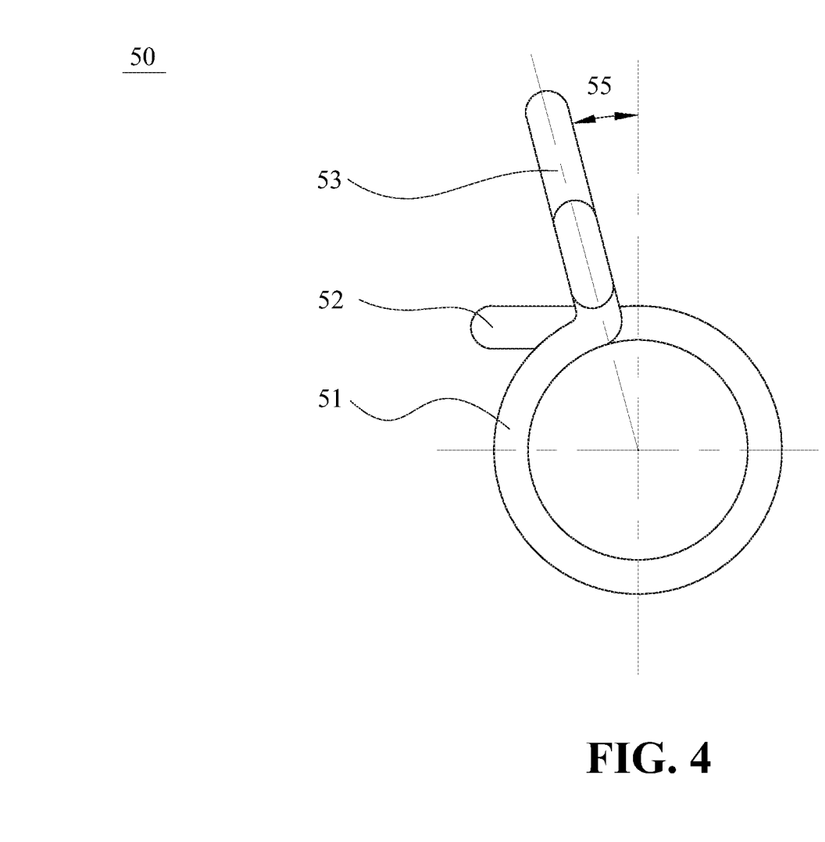
FIG. 4 is a bottom of the tension spring employed in the cushion device of the present invention for a foldable chair.

FIG. 4 is a bottom of the tension spring 50 employed in the cushion device of the present invention for a foldable chair. As shown, when the spring body 51 is viewed from the second end 512 toward the first end 511 thereof, the axis 5331 of the third extension section 5331 defines an angle 55 deviating from a plane extending perpendicularly to the axis of the spring body 51. Preferably, the deviating angle 55 is 10 degree with respect to the plane extending in the axis of the spring body 51.

Figure 5A:
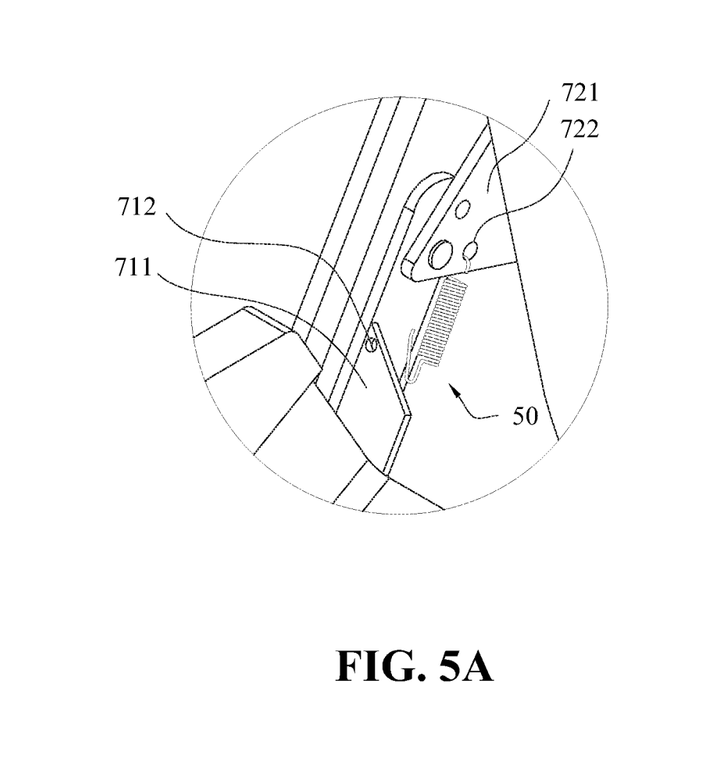
FIGS. 5A, 5B and 5C respectively illustrate how the tension spring employed in the cushion device of the present invention is installed into a foldable chair.
Figure 5B:
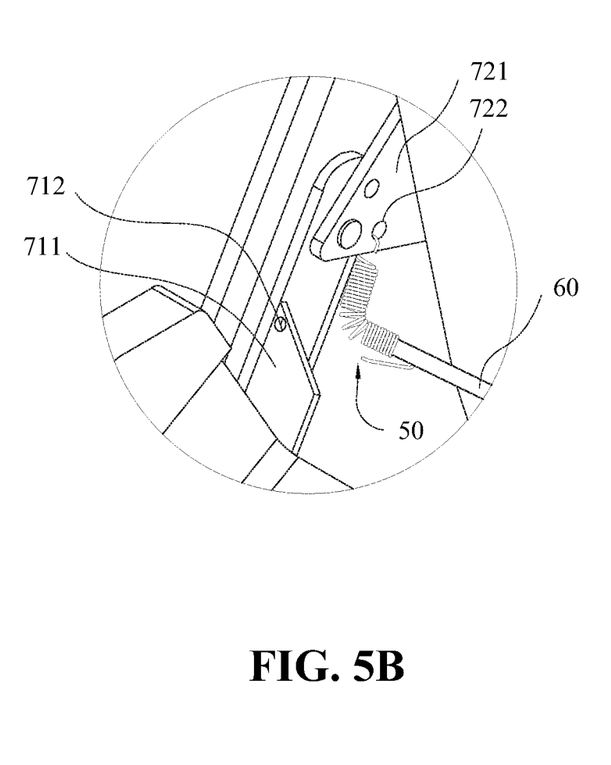
Figure 5C:
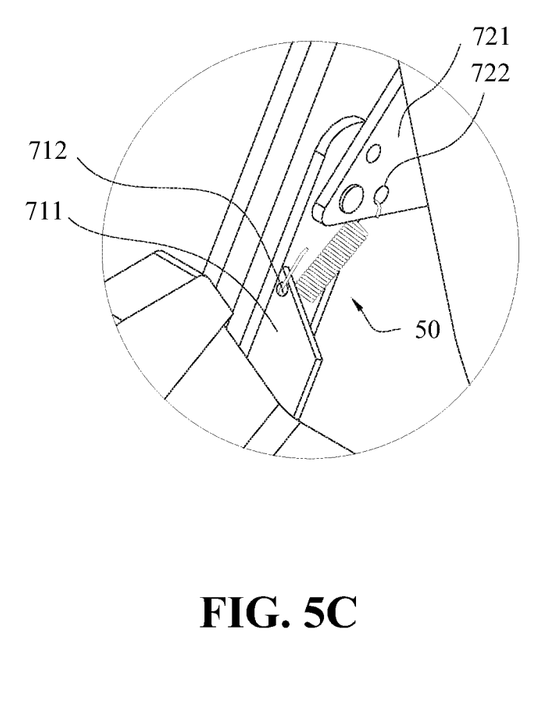

FIGS. 5A, 5B and 5C respectively illustrate how the tension spring employed in the cushion device of the present invention is installed into a foldable chair. As best shown in FIG. 5A, the first bent section 522 of the first hooking portion 52 of the tension spring 50 is engaged in the first hooking hole 722 in the pivot plate 721 after which a tool 60 is inserted into the spring body 51 to bend the second hooking portion 53 of the spring body 51, as best shown in FIG. 5B, in order to align the fourth extension section 534 with the second hooking hole 712 in the limiting plate 711 and the fourth extension section 534 is pushed to pass through the second hooking hole 712, thereby engaging the second bent section 532 in the second hooking hole 712 of the limiting plate 711. Thus, the tension spring 50 is installed in the foldable chair, as best shown in FIG. 5C.

Figure 6A:
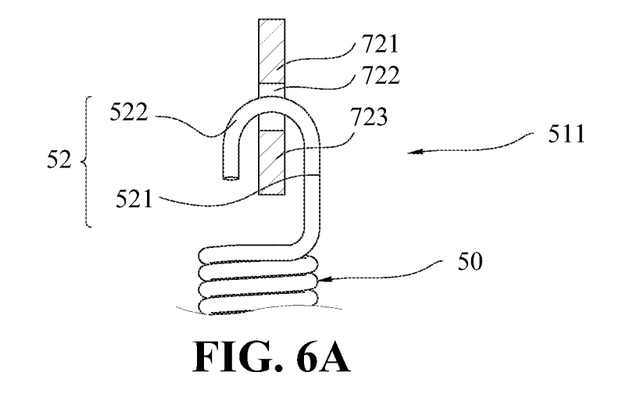
FIGS. 6A and 6B respectively illustrate how the tension spring of the present invention is attached in a foldable chair.
Figure 6B:
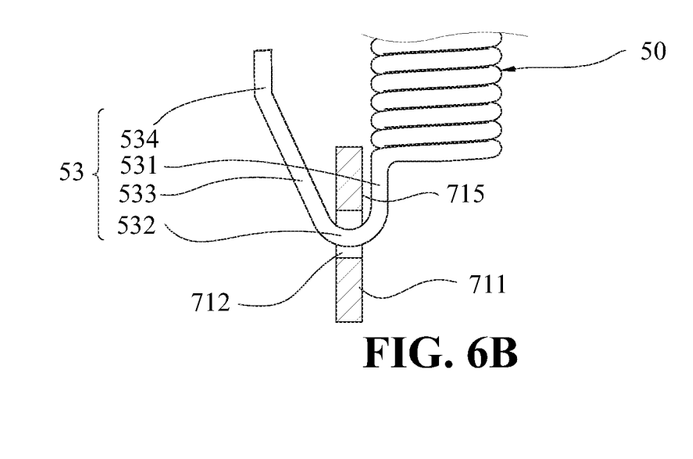

FIGS. 6A and 6B respectively illustrate cross-sectional views showing how the tension spring 50 of the present invention is attached in a foldable chair. As shown in FIG. 6A, after the first bent section 522 of the first hooking portion 52 of the tension spring 50 is engaged in the first hooking hole 722 in the pivot plate 721, the first extension section 521 of the first hooking portion 52 extends parallel with the plate body 723 of the pivot plate 721; and after the second hooking portion 53 of the tension spring 50 engages the second hooking hole 712 in the limiting plate 711, the second extension section 531 of the second hooking portion 53 extends parallel with the plate body 715 of the limiting plate 711, as best shown in FIG. 6B.

Since the first bent section 522 of the first hooking portion 52 and the second bent section 532 of the second hooking portion 53 are prevented by the plate bodies 723, 715 of the pivot plate 721 and the limiting plate 711, when the seat 720 is folded due to restoration force of the tension spring 50, the first and second bent sections 522, 532 of the first and second hooking portions 52, 53 do not fall off the first and second hooking holes 722, 712 of the pivot and limiting plates 721 and 711 due to presence of the included angle 54 between the third and second extension sections 533, 531 of the tension spring 50. In other words, the second bent section 532 of the second hooking portion 53 constantly engages the second hooking hole 712 in the limiting plate 711 during the seat 720 is unfolded or folded procedure, thereby eliminating the deformation of the L-shaped engaging hook of the prior art tension spring due to long used period.

Figure 7:
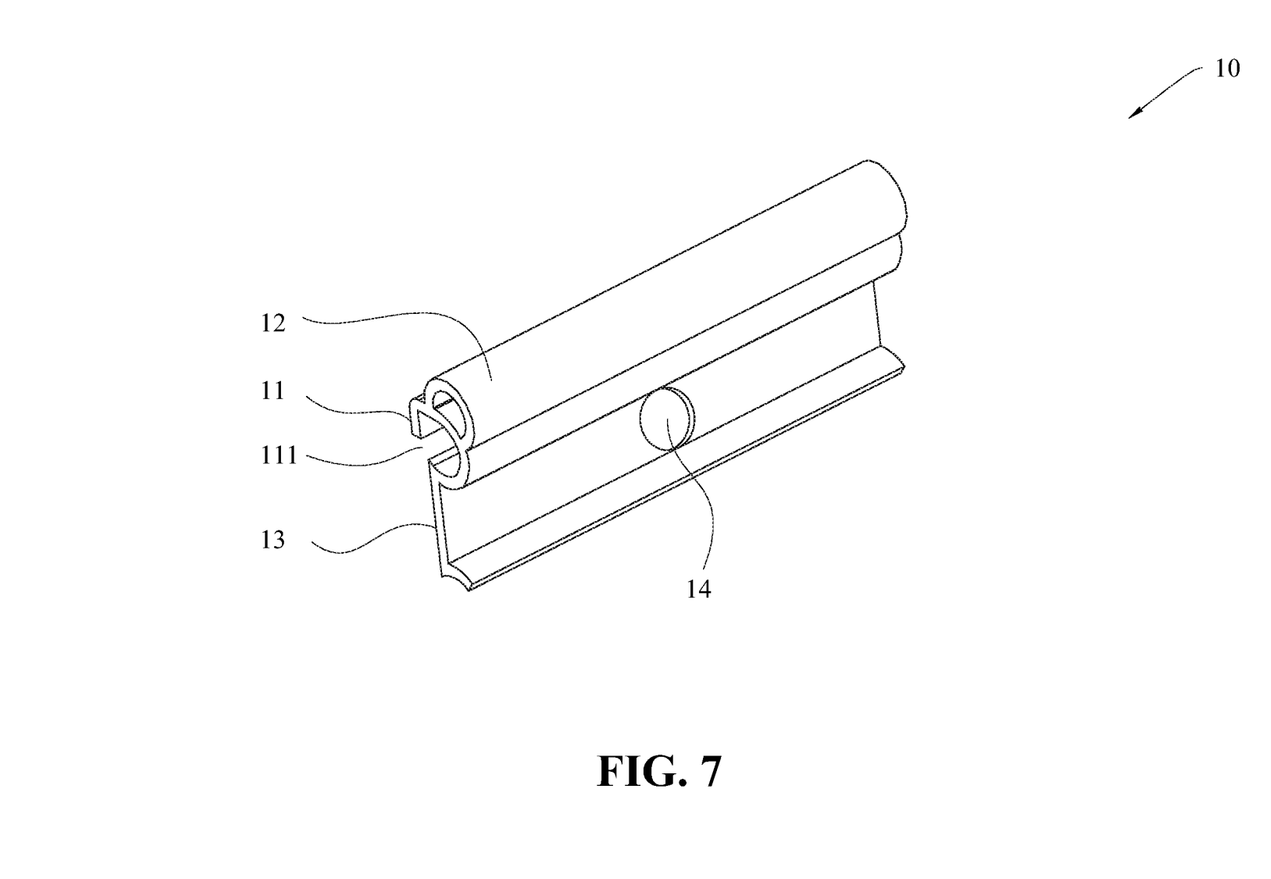
FIG. 7 shows a perspective view of a buffer member employed in the cushion device of the present invention for a foldable chair.

FIG. 7 shows a perspective view of a buffer member employed in the cushion device of the present invention for a foldable chair. As shown (also see FIG. 9), the buffer member 10 of the present invention is made from elastic materials like PVC or rubber having restoration force. The buffer member 10 includes a sleeve portion 11 for sleeving over a side part 713 of the rear leg 740, a buffer portion 12 provided on a top side of the sleeve portion 11 and an embedded portion 13 provided along a lateral side of the sleeve portion 11 in order to be embedded in a side channel 714 of the rear leg 740. The embedded portion 13 is formed with a fixing hole 14 to permit extension of the fixing element 750 therethrough, thereby fixing the buffer member 10 securely to the rear leg 740.

In one embodiment of the present invention, the buffer portion 12 of the buffer member 10 has two opposite ends in form of a hollow configuration, thereby defining a hollow tube between the two opposite ends so as to enhance the absorbing vibration effect.

Note that the buffer member 10 is generally designed to be configured with the structure of the chair leg to which it is to be installed. In this embodiment, the side part 713 of the rear leg 740 is generally curled outward in order to form an elongated roll 713 such that an inner profile of the sleeve portion 11 of the buffer member 10 is configured to be sleeved over the side part 713 of the rear leg 740. It is to note that the sleeve portion 11, the buffer portion 12 and the embedded portion 13 are fabricated in the same length relative to one another in order to distribute the impact force effectively during collision of the seat against the chair leg.

Figure 8A:
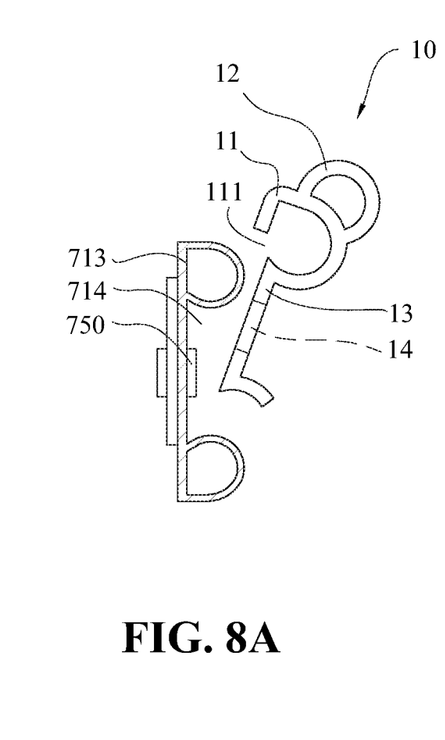
FIGS. 8A, 8B and 8C respectively illustrate how the buffer member employed in the cushion device of the present invention is installed in a foldable chair.
Figure 8B:
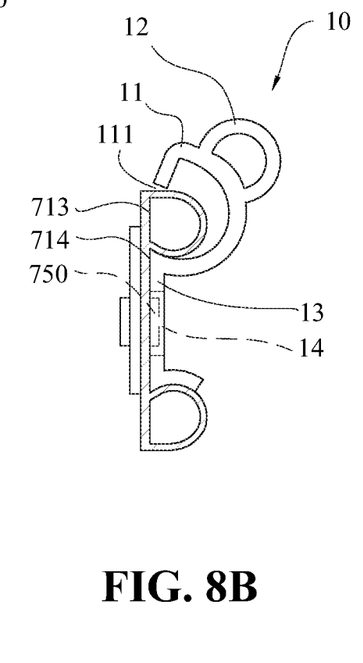
Figure 8C:
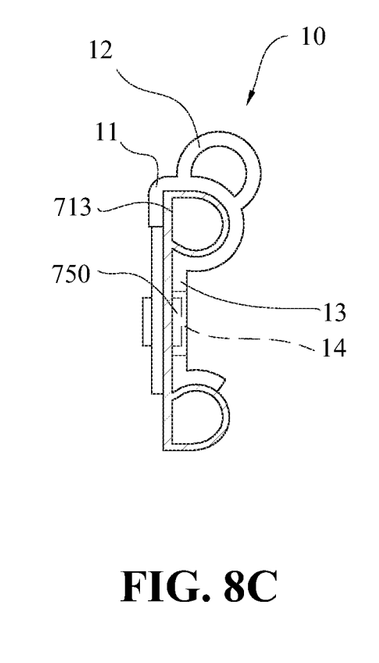

FIGS. 8A, 8B and 8C respectively illustrate how the buffer member employed in the cushion device of the present invention is installed in a foldable chair. First of all, after holding the buffer member 10 in the operator's hand, the embedded portion 13 is press-fitted inside the side channel 714 of the rear leg 740. Afterward, the notch 111 at the lower part of the sleeve portion 11 is sleeved over the elongated roll 713 such that the sleeve portion 11 on the side part of the rear leg 740, thereby completing the installation of the buffer member 10 on the rear leg 740. Since the buffer member 10 can absorb the impact of the seat 720, little vibration or noise will be resulted when the seat 720 retrieves to its folded condition.

Figure 9:
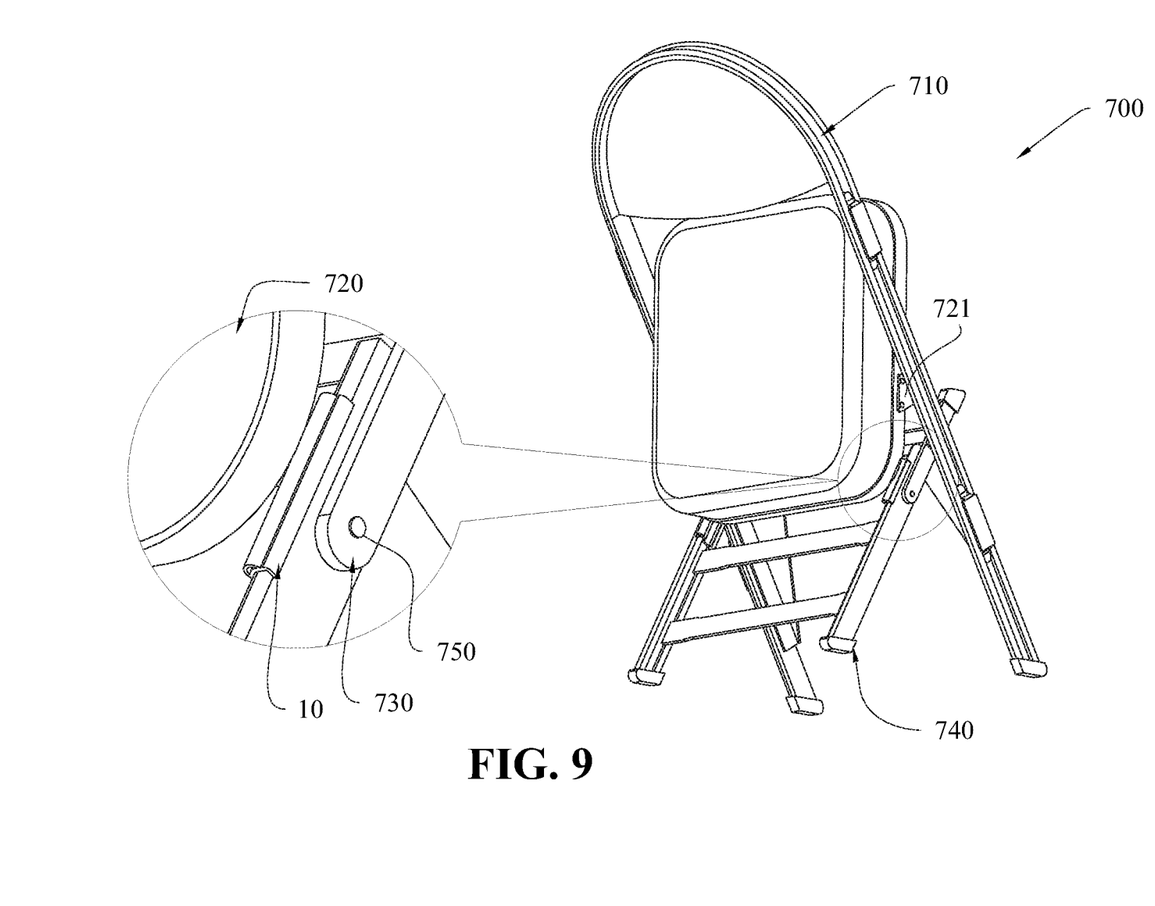
FIG. 9 is a schematic view of a foldable chair illustrating how the seat reacts after striking the buffer member employed in the cushion device of the present invention.

FIG. 9 is a schematic view of a foldable chair illustrating how the seat reacts after striking the buffer member employed in the cushion device of the present invention. As shown, when the seat 720 collides against the buffer portion 12 of the buffer member 10 during automatic retrieving to the folded condition due to restoration force of the tension spring 50, the impact absorbs by the buffer portion 12 escapes from two opposite ends thereof as air such that the seat 720 is prevented from wobbling or vibrating relative to the rear leg 740. In other words, the seat 720 generally made from metal is prevented from direct collision on the rear leg 740 so as to reduce generation of noise.

When the cushion device of the present invention is installed to a foldable chair, since the front leg 710 and the seat 720 are interconnected by the tension spring 50 and in order to prevent the second hooking portion 53 from deformation after a long period of the use, an included angle 54 is formed between the second and third extension sections 531, 533 in such a manner that the second bent section 532 of the tension spring 50 does not fall off the second hooking hole 712 in the limiting plate during automatic retrieving of the seat 720 to the folded condition.

Moreover, since the embedded portion 13 of the buffer member 10 is formed with the fixing hole 14 to permit extension of the fixing element 750 therethrough so as to fix the buffer member 10 securely on the rear leg 740, the buffer member 10 is prevented from down sliding on the rear leg 740 regardless of impact of the seat 720 on the buffer member 10. In other words, the buffer member 10 provides high impact absorbing effect during automatic retrieving of the seat 720 to the folded condition.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A foldable chair with a cushion device that includes a pair of front legs provided with a limiting plate, a seat, a support frame, and a pair of rear legs, the seat including a pivot plate via which the support frame is connected pivotally to the seat and a fixing element for connecting the support frame securely to the rear legs, wherein the cushion device comprising:
    a buffer member including a sleeve portion for sleeving over a side part of the rear leg, a buffer portion provided on a top side of said sleeve portion and an embedded portion provided along a lateral side of said sleeve portion in order to be embedded in a side channel of the rear leg, said embedded portion being formed with a fixing hole to permit extension of the fixing element therethrough; and
    a tension spring including a spring body having opposite first and second ends, a first hooking portion and a second hooking portion disposed at said first and second ends respectively such that said first hooking portion includes a first extension section extending in a direction away from said spring body parallel to an axis of said spring body and a first bent section extending curvedly from said first extension section toward said spring body in order to engage the pivot plate of the seat while said second hooking portion includes a second extension section extending in a direction away from said spring body parallel to an axis of said spring body, a second bent section extending curvedly from one end of said second extension section toward said spring body in order to engage the limiting plate of the front leg and a third extension section extending from one end of said second bent section so as to define an acute angle between axes of the third extension section and the second extension section, wherein said third extension section has a longitudinal length measured from one end of said second bent section distal from said spring body equivalent to or greater than ⅓ length of said spring body.

2. The foldable chair with a cushion device according to claim 1, wherein said acute angle ranges from 0-45 degrees.

3. The foldable chair with a cushion device according to claim 2, wherein said acute angle is 30 degrees.

4. The foldable chair with a cushion device according to claim 1, wherein said second hooking portion further includes a fourth extension section extending integrally from said third extension section and having a longitudinal length shorter than that of said third extension section.

5. The foldable chair with a cushion device according to claim 1, wherein when said spring body is viewed from said second end toward said first end thereof, said axis of said third extension section defines an angle deviating from a plane extending perpendicularly to said axis of said spring body.

6. The foldable chair with a cushion device according to claim 5, wherein said deviating angle is 10 degree with respect to said plane extending in said axis of said spring body.

7. The foldable chair with a cushion device according to claim 1, wherein the pivot plate is formed with a first hooking hole having an axis perpendicularly crossing an axis of the front leg and permitting engaging of said first bent section of said first hooking portion of said tension spring and wherein the limiting plate is formed with a second hooking hole to permit engaging of said second bent section of said second hooking portion of said tension spring.

8. The foldable chair with a cushion device according to claim 1, wherein said buffer portion of said buffer member has two opposite ends in form of a hollow configuration, thereby defining a hollow tube between said two opposite ends.

9. The foldable chair with a cushion device according to claim 1, wherein said sleeve portion of said buffer member is generally G-shaped cross section so as to define a notch at a lower part thereof for sleeving on the side part of the rear leg.

10. The foldable chair with a cushion device according to claim 2, wherein the side part of the rear leg is generally curled outward in order to form an elongated roll such that an inner profile of said sleeve portion of said buffer member is configured to be sleeved over the side part of the rear leg.

11. The foldable chair with a cushion device according to claim 1, wherein the side channel of the rear leg is a tail socket in cross section while said embedded portion of said buffer member is configured as a tail in cross section for fitting securely into the side channel.

* * * * *